United States Patent [19]
Hase

[11] Patent Number: 5,142,163
[45] Date of Patent: Aug. 25, 1992

[54] HIGH SPEED LOAD TRANSFER SYSTEM

[76] Inventor: Alfred M. Hase, 6 Manorwood Road, Scarborough, Ontario, Canada, M1P 4G7

[21] Appl. No.: 91,022

[22] Filed: Aug. 31, 1987

[51] Int. Cl.$^5$ .............................................. H02J 9/00
[52] U.S. Cl. ...................................... 307/64; 307/66; 307/87; 363/61
[58] Field of Search ......................... 307/64, 66, 85, 86, 307/87, 43, 44, 45, 46, 48, 49, 50, 54, 58, 126, 109, 110; 320/21, 43, 23, 31, 48; 363/164, 61

[56] References Cited

U.S. PATENT DOCUMENTS

| | | | |
|---|---|---|---|
| 3,789,236 | 1/1974 | Lacroix | 307/126 X |
| 3,971,957 | 7/1976 | Hase | |
| 3,986,085 | 10/1976 | Weber | 363/61 X |
| 4,025,823 | 5/1977 | Lang et al. | 361/92 X |
| 4,090,090 | 5/1978 | Johnston | 307/64 X |
| 4,142,141 | 2/1979 | Hase | 323/6 |
| 4,187,777 | 9/1979 | Allington | 363/61 |
| 4,195,233 | 3/1980 | Udvardi-Lakos | 307/66 |
| 4,231,029 | 10/1980 | Johnston | 307/64 X |
| 4,311,919 | 1/1982 | Nail | 307/64 |
| 4,384,213 | 5/1983 | Bogel | 307/64 |
| 4,399,396 | 8/1983 | Hase | 307/66 X |
| 4,437,147 | 3/1984 | Takamura et al. | 363/61 |
| 4,510,401 | 4/1985 | Legoult | 307/87 X |
| 4,556,802 | 12/1985 | Harada et al. | 307/66 |
| 4,564,767 | 1/1986 | Charych | 307/87 X |
| 4,608,500 | 8/1986 | Togawa | 363/61 X |
| 4,672,227 | 6/1987 | Lagree et al. | 307/64 |
| 4,677,309 | 6/1987 | Ogawa | 307/87 X |
| 4,747,061 | 5/1988 | Lagree et al. | 361/88 X |

FOREIGN PATENT DOCUMENTS 0155625 9/1982 Japan ..................................... 363/61

Primary Examiner—Paul Ip
Attorney, Agent, or Firm—Donald E. Hewson

[57] ABSTRACT

A high speed load transfer system for use with critical loads, e.g. computers, includes a high speed transfer logic circuit which has rapid sensing and rapid contactor energizing means; so that in the event of power failure, power to the critical load can be switched instantaneously to an alternative power supply. A solid state sensor, responsive to a step change, detects instantaneous power failure and operates an output to a contactor. A voltage doubler circuit using an AC input capacitor and a DC output capacitor is provided at the contactor, with the DC capacitor connected across the contactor; so that when a transfer signal is received at the contactor, the DC capacitor is discharged across the contactor, so as to provide a surge of power through the switch means when the switch means closes and to minimize contactor response time—as well as to ensure connection to the critical load. The power supply can be a commercial AC line, or a hot standby inverter. In one embodiment, a differential voltage sensor is provided in parallel with the step sensor to sense voltage failure such as brown-outs, or failures within a set time interval e.g., 2–4 msec after the event. In another embodiment, an inverter voltage sensing circuit is provided for switching power from the inverter to a bypass AC line in the event of overload.

13 Claims, 6 Drawing Sheets

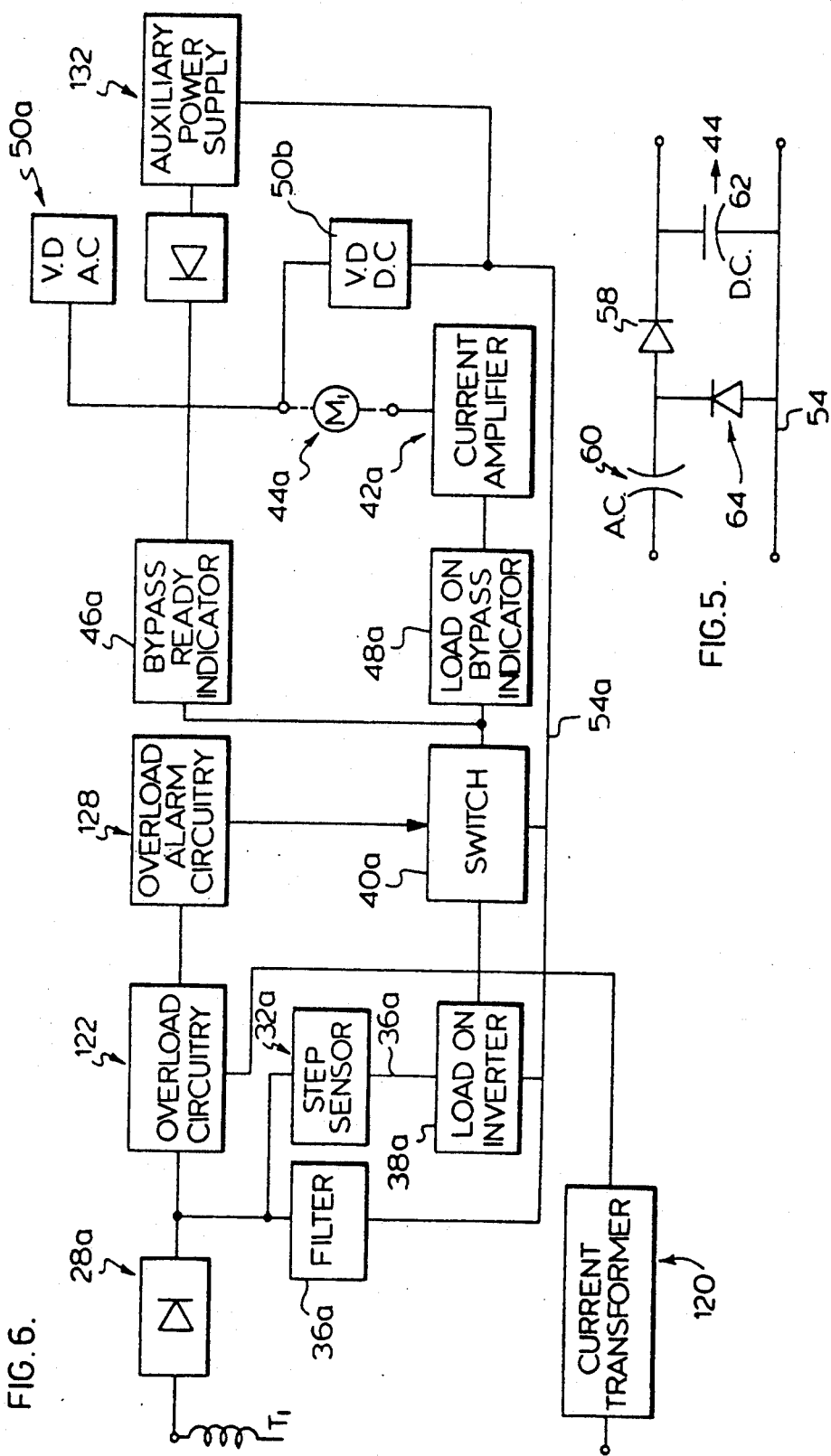

HIGH SPEED LOAD TRANSFER SYSTEM

FIELD OF THE INVENTION

The present invention relates to a high speed load transfer system for protecting critical loads such as computer satellite links and the like against high and low voltages, complete failures, brown outs, waveform distortions and the like. In particular, the present invention relates to a high speed, no-break load transfer system for uninterruptable power systems (UPS systems); and the present invention provides a high speed transfer logic circuit, for effecting rapid switching of power supplied to a critical load, to an alternative supply of power. The invention is particularly applicable to apparatus which uses an inverter as an alternative power supply, but is equally as useful in a system which uses an inverter as a principal power supply for the critical load. The invention also relates to a method of rapidly switching power to protect a critical load; and also to apparatus and a method for protecting an inverter from overload.

BACKGROUND OF THE INVENTION

A high speed electrical load transfer system should satisfy a number of criteria in addition to being reliable and relatively inexpensive. It should minimize the variation in the power supply and should, in the event of power variation, such as gross failure, brown outs, harmonic distortion and the like, switch to an alternative power supply as soon as possible. The electrical load transfer system should minimize the amount and cost of components to increase reliability, and at the same time minimize cost of the system. It should also, in certain situations, provide capability for overload protection of a power supply wherein an inverter is used. Moreover, in an alternative power mode it should provide galvanic isolation upstream so that repair and maintenance of the primary power source can be performed in a safe manner.

U.S. Pat. No. 3,971,957 to HASE, issued Jul. 27, 1976 discloses an electrical load transfer control system which has two power sources, one being an inverter and the other being a commercial power source, where the load is critical and is normally connected to the inverter. The load transfer control system is provided to ensure an uninterrupted power supply to the load in the event of inverter failure. The load transfer control system includes a fault detector connected to the inverter, a fast acting and normally open switch connected to the commercial power source and to the load, and a slower acting and normally closed switch connected to the inverter and the load. In the apparatus, when an inverter fault is sensed, there is a momentary make-before-break switch action of the two switches. A ferro-resonant circuit is in the inverter circuit, and has a storage element with enough energy storage capacity to carry the load during the period that it takes for the fault detector to operate and for the first switch to close. The switches are contactors or similar devices, so that there is complete voltage and current isolation of one power source from the other when the respective switch is open. The fault detector may operate in less than two milliseconds.

However, in many situations a response time of two milliseconds is far too long and critical loads such as computers, satellite links and the like must be switched much faster—in the order of one millisecond or less. In other situations, it may not be necessary to switch the critical load so fast, for example, in the case of brown outs. The above mentioned patent to HASE has certain disadvantages, namely that the response time is too slow for certain critical load switching, and also that it is inflexible in providing controlled switching in response to different failure conditions. Thus, the applicability of the load transfer control system of the aforementioned patent is somewhat limited; but on the other hand, it does permit no-break switching to be utilized.

An object of the present invention is to provide an improved load transfer system which obviates or mitigates one or more of the aforesaid disadvantages; and particularly when operating as part of a no-break UPS system.

This is achieved by providing a high speed load transfer system with a high speed transfer logic circuit which includes rapid sensing and rapid energizing means, so that in the event of a power failure, power to the critical load can be switched substantially instantaneously to an alternative power supply. A power supply detector in the form of a solid state chip which is responsive to a step input signal is used to substantially instantaneously sense a change in the primary power supply; and in the event of a gross failure, the output of the solid state chip is fed to a voltage amplification circuit which induces or ensures a rapid surge of current to actuate a power transfer switch, thereby to ensure substantially instantaneous connection of the critical load to an alternative power supply.

The power supply is normally a commercial AC line, with an alternative power supply in the form of a hot stand-by inverter. Alternatively, the power supply can be an inverter, with the alternative power supply in the form of a commercial AC line as a by-pass line.

The high speed load transfer system includes, in one embodiment, two discrete primary AC voltage sensing means. One is a step sensor as described above to sense rapid and large changes in input voltage, such as power failure; and the other is a differential sensor connected in parallel with said step sensor to sense failure due to other causes such as harmonic distortion and brown out, where the response of time of actuation is different from that for instantaneous power failure, and requires a different response. The differential and instantaneous primary voltage sensors operate in parallel to provide an efficient switch, and normally use a single common chip which minimizes the cost and redundancy of components.

The high speed load transfer system also includes a voltage amplification circuit in the form of a voltage doubler. The voltage doubler incorporates an AC input capacitor and a DC output capacitor coupled to a transfer contractor, which is usually a normally open/normally closed (NO/NC) contactor, but which may be a solid state switch for higher power applications. The DC capacitor is kept high to provide, on switching, a "high in-rush current" to speed up contactor operation and thereby to provide a very fast transfer. The AC input capacitor functions first as a doubler; and after the DC capacitor is discharged into the coil, the AC capacitor functions as an AC resistor with an impedance proportional to 1/ C, so as to supply and limit the DC voltage to the coil to a low DC voltage. As an example, for 140 volts in the voltage doubler circuit, there is a 300 volt output open circuit AC voltage, and a DC closed circuit voltage in the range of 10 to 48 volts—depending on the specific circuit components being used.

In one embodiment, the invention consists of a high speed load transfer system including an instantaneous step sensor plus a differential sensor, and further including the voltage doubler. That embodiment is particularly suitable for use with a hot stand-by inverter.

In another embodiment, the high speed load transfer system includes an instantaneous voltage step sensor together with a voltage doubler circuit and a current overload control circuit, and this is particularly suitable for use in a situation where power is supplied to a critical load from an inverter. In the event of failure of the inverter, power is switched to the critical load from a bypass line.

Thus, in one aspect of the invention there is provided a high speed load transfer system for use as a no-break load transfer system; whose purpose is for coupling an alternative source of AC voltage to a critical load in the event of interruption or failure of the primary AC voltage source.

The high speed load transfer system comprises a sensing means for detecting a change in the primary AC voltage source, where the sensing means has an output coupled to a switch means for switching the critical load between the primary AC voltage source and an alternative AC voltage source. Actuating means are associated with the switch means and are responsive to the output of the sensing means for actuating the switch means in the event of interruption or failure in the primary AC voltage source, so as to rapidly couple the critical load to the auxiliary AC voltage source.

In a second aspect of the invention, there is provided a high speed transfer logic circuit for use with a high speed load transfer system, to maintain an AC power supply to a critical load. This is essentially critical when the load transfer is to be effected within a no-break UPS system.

The high speed transfer logic circuit comprises a sensing means for sensing interruption or failure of an inverter AC power supply from an in-line inverter, where the sensing means has an output. Switch means are provided, which are responsive to an output from the sensing means to couple the critical load to an alternative AC power supply in the event of failure or interruption of the inverter AC power supply. The switch means has associated therewith means for providing a current surge through the switch means at the instant when the switch means closes, so as to minimize the time taken to couple the critical load to the alternative AC power supply.

Preferably the alternative AC power supply is a commercial AC bypass line.

Preferably also, the means for ensuring a current surge through the switch means is a voltage doubler circuit, consisting of a lower voltage AC input capacitor and a high voltage DC output capacitor. Conveniently, the voltage doubler circuit includes diode rectifying means coupled between the AC input capacitor and the DC output capacitor.

The DC output capacitor stores energy therein for fast transfers, after the switch means has closed to recharge the DC capacitor. Conveniently, the AC capacitor functions as a AC resistor after the switching has occurred, so as to limit the DC current to the switch means—which is typically a contactor coil.

Preferably, the high speed transfer logic circuit includes overload protection means for protecting the inverter in the event of overload of the inverter. The overload monitoring means comprises a current transformer means for monitoring the real output of the inverter, and for providing a DC voltage signal proportional to the inverter output. There is a voltage overload comparator means for comparing the current transformer output with a reference value, and timing means coupled to the overload comparator means. The timing means provides an overload output signal after a predetermined time, depending on the magnitude of the overload; and the overload output signal is coupled to switch means responsive to the overload signal, for coupling the critical load to the commercial AC bypass line. This gives a transfer logic circuit having Inverse Time Sensing; by which is meant that the higher the level of the overload, the faster will be the switching or response time to couple the critical load to the AC bypass line.

Ideally, the overload protection means includes interlock means coupled to the overload and transfer logic circuitry, for preventing re-transfer of the critical load until the overload rating falls beneath 100%. Conveniently, the interlock means includes manually resettable switch means, which resets the overload circuit so as to permit re-transfer of the load. It will be appreciated that alarm circuitry is included in the overload monitoring means.

It will also be appreciated that the voltage doubler circuit and overload circuitry can be applied to the inverter when used in a bypass or an in-line mode, and the voltage doubler circuitry is applicable to all load transfer devices to minimize the switching time and to ensure that the critical load is coupled in minimal time. The premise of a no-break UPS circuit is that there shall be no discontinuity of supply of power to a critical load, and that transfer of the load from the primary power source to an alternative power source shall be effected as quickly as possible. This may be especially important in the event of gross failure of the primary power source, or excessive overload when the primary power source is an inverter.

Accordingly, in other aspects of the invention there are provided methods of transferring a critical load at high speed to an alternative AC power source, and a method of rapidly energizing contactors using a circuit having a low voltage AC input capacitor and a high voltage DC output capacitor. In the methods according to this invention, rectifier means are coupled between the AC input capacitor and the DC output capacitor so that the output voltage across the DC capacitor is approximately double that at the input to the AC capacitor.

In another aspect of the present invention, there is provided a method of transferring a critical load to an alternative AC power source. The method comprises the steps of:

sensing substantially instantaneously a change in the AC supply to the critical load, by sensing reverse power flow from a tuned circuit;

generating an output signal in response to the change in supply, and feeding the output signal to a load transfer switch means; and amplifying a voltage signal to be supplied to the load transfer switch means, so as to create a current surge to minimize the time taken to transfer the critical load.

BRIEF DESCRIPTION OF THE DRAWINGS

These and other aspects of the invention will become apparent from the following description when taken in combination with the accompanying drawings, in which:

FIG. 5 is a representative circuit diagram of the voltage doubler circuit shown in FIG. 4;

FIG. 6 is a schematic block diagram of the high speed transfer logic circuit shown in FIG. 2.

DESCRIPTION OF THE PREFERRED EMBODIMENTS

Figure 1:
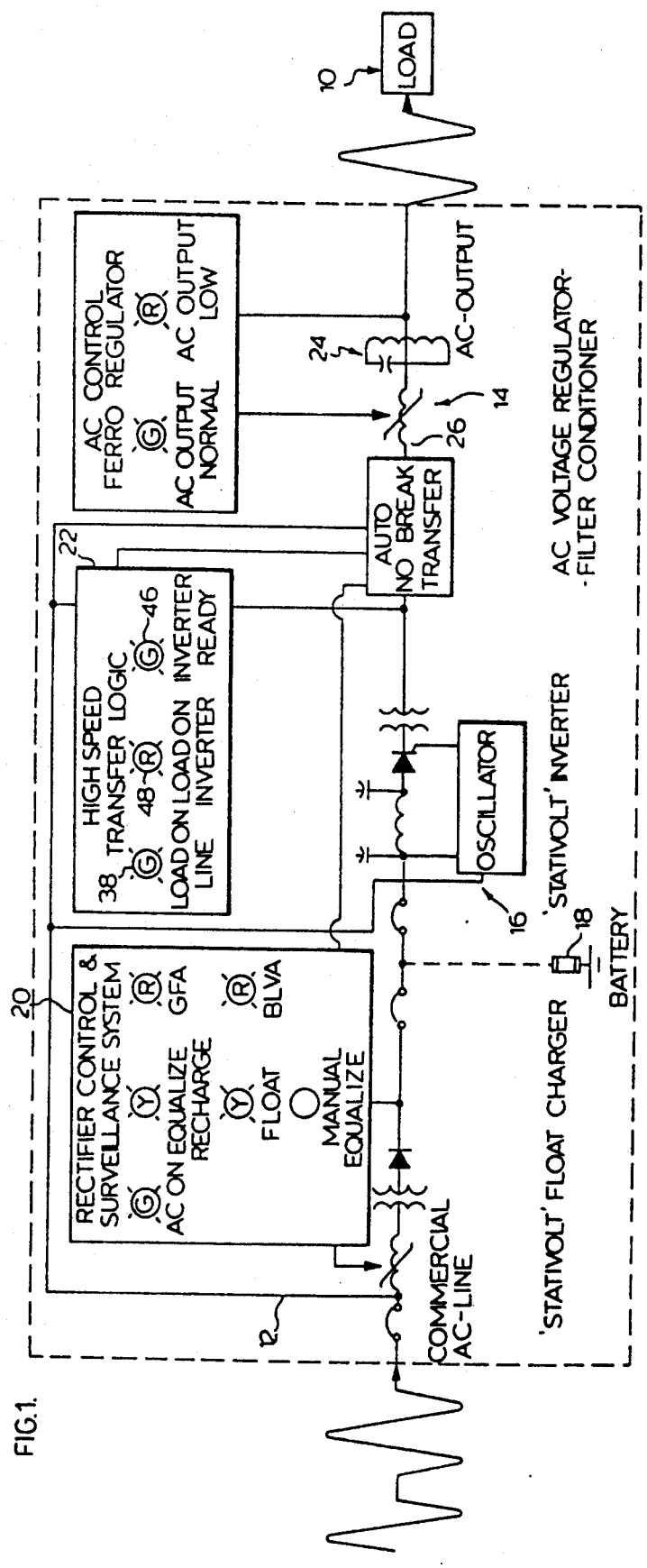
FIG. 1 is a schematic block diagram of one embodiment of a high speed load transfer system, in which the alternative AC power is supplied by an inverter.

Reference is first made to FIG. 1 of the drawings, which depicts a block diagram of a STATIVOLT (trademark) emergency lighting system incorporating a high speed transfer logic circuit in accordance with one aspect of the present invention. AC power to an emergency lighting or critical load 10 is supplied from a commercial AC line 12, and the AC line 12 includes an AC voltage regulator, filter and conditioner 14 for protecting lamps and ballasts at all times, and for regulating the AC voltage and for removing spurious signals. It is based on a ferroresonant voltage regulating circuit such as is disclosed in U.S. Pat. No. 4,142,141 issued Feb. 27, 1979 to HASE.

In parallel with the commercial AC line is a hot stand-by inverter generally indicated by reference numeral 16. The inverter 16 provides an alternative supply of AC power for the load 10; and is switched to in the event of failure of the commercial AC line, as described hereafter. Such line failure might be, for example, due to brown outs, unwanted line harmonics, or even a complete power failure as will be later described. The inverter power is supplied from a battery 18, which is charged by a trickle charge from such as a STATIVOLT charger; so as to permit the inverter to supply power to the load for a predetermined time which may be of the order of ninety minutes or two hours—depending on the size of the batteries.

A rectifier control and surveillance system 20 is also provided, which monitors the charge to the battery. A high speed transfer logic circuit 22 monitors power failure or interruption, for switching the load 10 so as to be supplied from the inverter 16.

Figure 4:
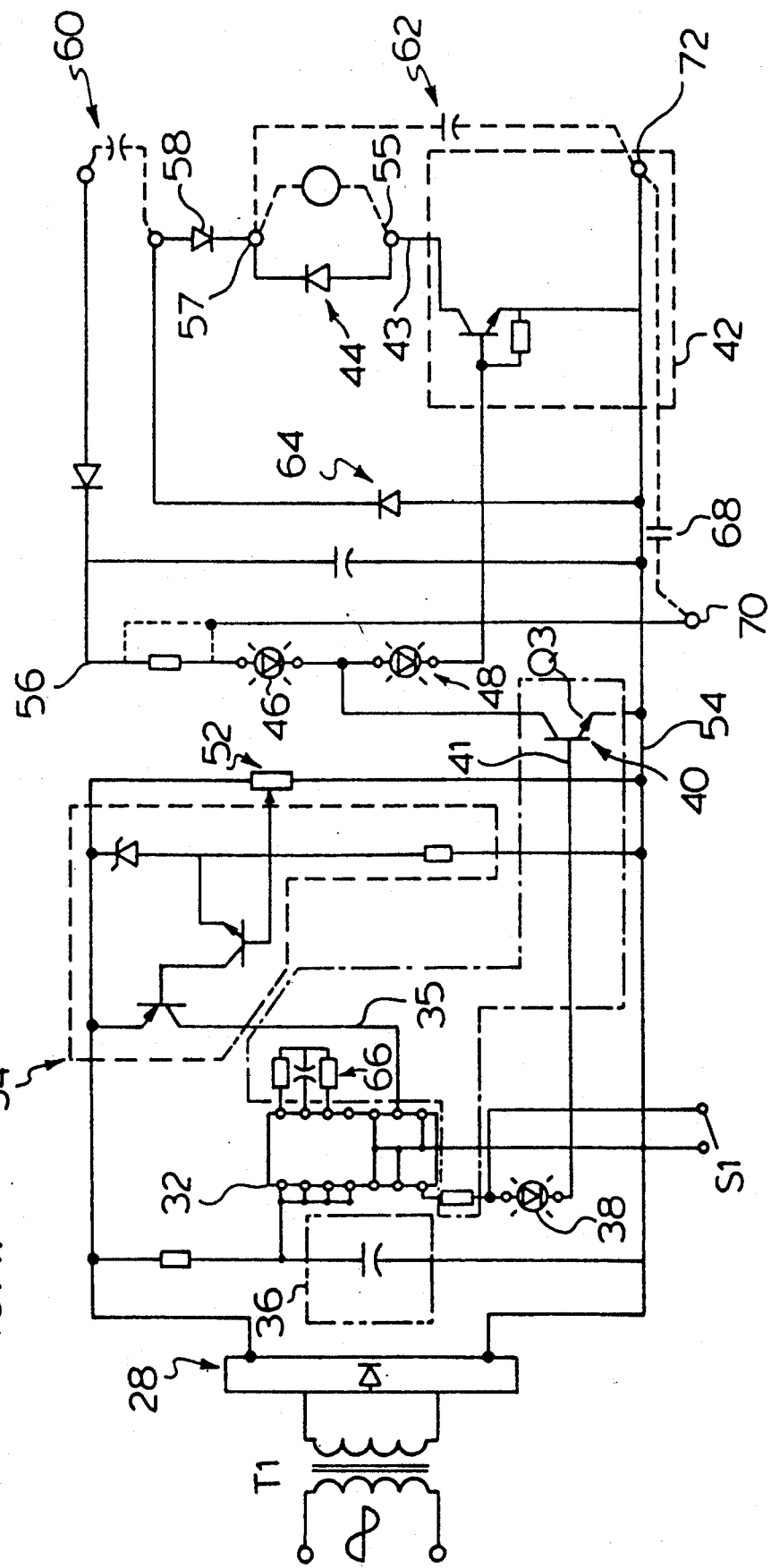
FIG. 4 is a more detailed circuit diagram of the block diagram shown in FIG. 3, showing the principal operating components thereof in a typical operating circuit.

The commercial AC line 12 has a tuned circuit 24 at the output and, as the line voltage falls, feedback from the tuned circuit 24 passes through a linear reactor 26 so that the stored energy from the tuned circuit attempts to keep the line high. If the contactor for the commercial AC line is still closed then, at a sensing transformer T1 as best seen in FIG. 4, there is instantaneous polarity reversal. This polarity reversal is sensed by the high speed transfer logic circuit 22, which acts to rapidly connect the hot stand-by inverter 16 to the load 10.

Figure 3:
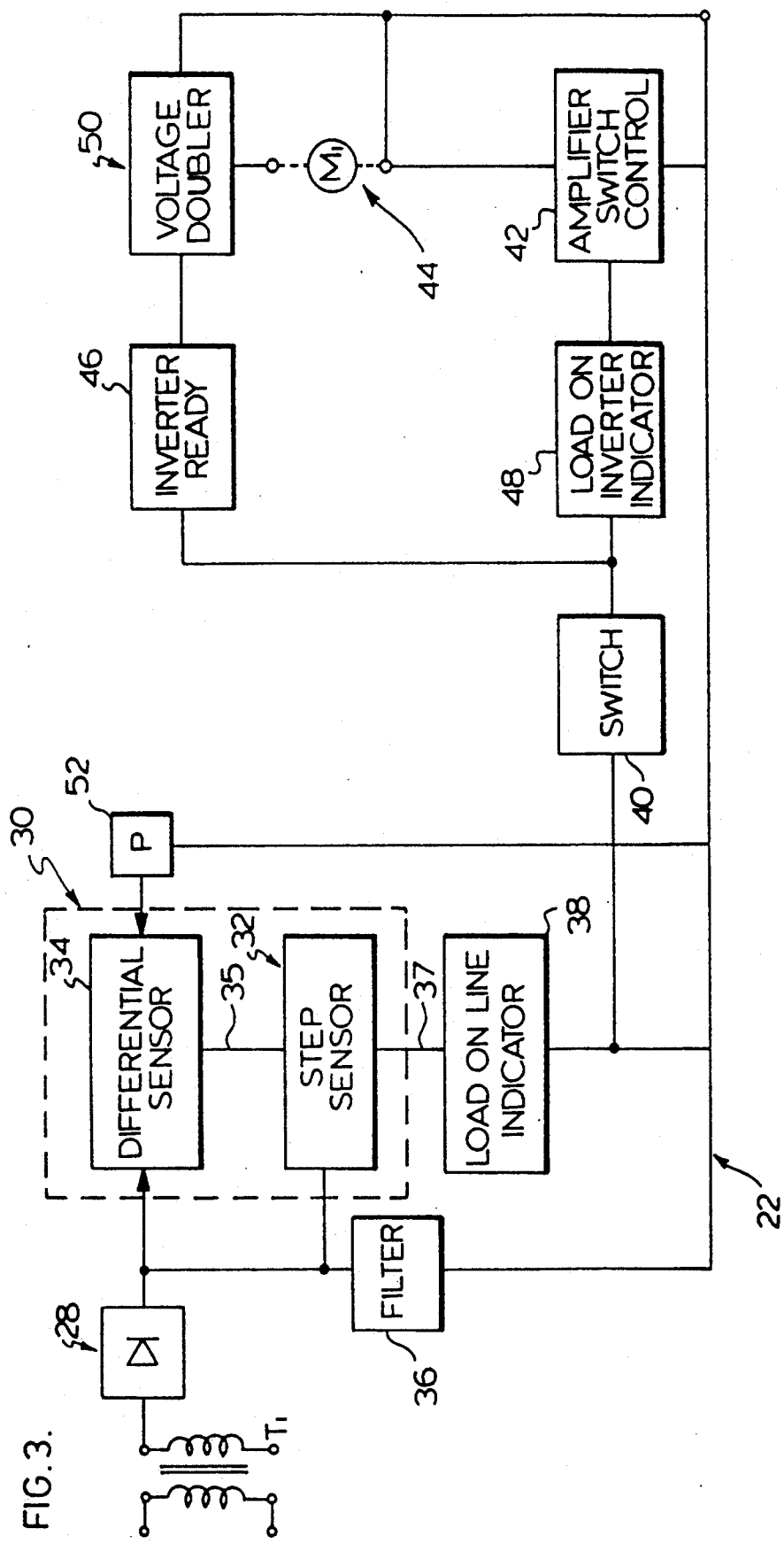
FIG. 3 is a schematic block diagram of the high speed transfer logic circuit shown in FIG. 1.

Reference is now made to FIG. 3 of the drawings, which depicts a block diagram of the high speed transfer logic circuit 22 as shown in FIG. 1. In the event of power failure, the power flow at transformer T1 is reversed, and this is passed through a rectifier circuit 28 to a sensing circuit generally indicated by reference numeral 30. The sensing circuit 30 includes a step sensor 32 and a differential sensor 34. An R.F. filter 36 is connected in parallel with the step sensor 32 to prevent nuisance triggering thereof. The step sensor 32 is based on an integrated circuit, and detects an instantaneous change in the unfiltered input voltage very rapidly; and in the event of power failure, it produces an output on line 37 which illuminates a load-on-line indicator 38 and passes a signal through to a switch 40. Switch 40 is normally closed, and holds an amplifier switch control 42 open; so that the switch 40 is arranged to couple the commercial AC line to the load and not to the hot stand-by inverter. In this mode, the inverter ready light 46 is illuminated to indicate that the inverter is on stand-by.

When the step sensor 32 provides an output signal in response to a change in the input—due to power failure, for example, at input transformer T1—a signal is provided to switch 40 which opens the switch and closes the amplifier switch control 42, and simultaneously illuminates the load-on-inverter indicator 48. The amplifier switch control 42 closes, to permit the voltage doubler circuit 50 to provide a rapid surge of current through switch 44, and thereby so as to rapidly close the switch 44 and ensure that the hot stand-by inverter 16 is rapidly connected to the load 10 in a make-before-break transfer to ensure continuity of power to the load.

The differential sensor 34 operates in a similar manner, and compares the voltage level between the unfiltered output of the rectifier 28 and the voltage at a potentiometer 52. The differential circuit 34 operates to detect a reduction in voltage such as a brown out within a period of two to four milliseconds. The exact timing can be set by the value of timing components within the sensor.

The output of the differential sensor 34 is coupled through step sensor 32 using an alternative circuit on the same chip to minimize the number of components being used. In the event of a fault occurring within two to four milliseconds, an output is passed through the load-on-line indicator 38 to extinguish it, and to the switch 40 to open it. The circuit then operates as before, with the end result that the load 10 is coupled to the hot stand-by inverter 16 rapidly and in a make-before-break situation, so as to ensure continuance of an AC power supply to the load 10. In other words, no-break switching of the load is effected.

Reference is now made to FIG. 4 of the drawings, which depicts a circuit diagram corresponding to the block diagram as shown in FIG. 3, having the principal operating components shown in some detail. As previously described, the transformer T1 detects flux collapse instantaneously; and this is due to tuned circuit 24 providing reverse power in the event of power failure such as brown out, harmonic distortion and the like. The voltage is rectified in the rectifier 28, and the unfiltered line is coupled to an input of differential sensor 34 and to an input of the IC step sensor chip 32. The RF filter 36 consists of at least a capacitor (and may also include a zener diode in parallel to it), and serves to control the voltage at the input to the step sensor 32 to prevent nuisance triggering in the event of spikes. It does not affect the operation of the transfer logic circuit due to failure of the commercial AC line supply. The chip has an output coupled to the load-on-line indicator 38 via current limiting resistor(s), and the load-on-line indicator 38 is coupled to the base 41 of switch 40—which is in the form of a transistor Q3. The emitter of the transistor is connected to a low rail 54, and the collector is coupled to a high rail 56 via the inverter ready indicator 46. The collector is also coupled to an amplifier 42 (which may include a Darlington pair) via the load-on-inverter indicator 48; and the output 43 of the amplifier 42 is coupled to one terminal 55 of the switch 44—which is generally in the form of a contactor or a solid state switch. The contactor would be used in lower power applications, whereas the solid state switch would be used in higher power applications. The other terminal 57 of the switch 44 is coupled via a diode 58 to an AC input capacitor 60, which in turn is coupled to the inverter ready indicator 46.

A DC capacitor 62 is coupled between the low rail 54 and the terminal 57, and a diode 64 is coupled between the AC capacitor 60 and the low rail 54. This arrangement is best seen in FIG. 5, and acts as a voltage doubler circuit so that in the event of an input voltage of say 140 volts, a 300 volt open circuit DC output is provided. This is because the diodes act to control the voltage to the DC capacitor 62, to charge it up to 300 volts DC open circuit. The switch 44 is usually provided to be a normally open/normally closed contactor having a control coil, and is used to provide a complete physical break with the commercial AC bypass line, and thereby to provide galvanic isolation as described above.

In operation, in the event of a power failure, this is detected by the transformer T1, and instantaneously the chip 32 provides an output signal which extinguishes the load-on-line indicator 38. The chip 32 also sends a high signal to the base 41 of the switch 40, which opens the transistor Q3. In this case, the current is diverted through the load-on-inverter indicator 48, which illuminates, and the switch 42 is actuated to provide an input signal to the contactor 44 so as to close it. Simultaneously, the voltage across the DC capacitor 62 is discharged through the control coil of contactor 44, and this discharge provides a surge and inrush of current to rapidly switch the contactor to a closed position, and to connect the hot stand-by inverter rapidly to the load 10.

Once the contactor 44 is closed, the voltage across the DC capacitor 62 is about 24 volts DC, and the AC capacitor 60 functions as an AC resistor with a resistance proportional to 1/ C to supply and limit the DC voltage at the coil to about 24 volts DC. This arrangement provides galvanic isolation of the line, and low cost operation together with little or no service or maintenance, because the AC capacitor requires less space and power and operates at about a tenth of the level of a DC capacitor.

Similarly, the differential sensor operates by comparing the voltage level at the filter 36, together with the voltage at potentiometer 52. An R.C. timing circuit 66 determines whether a signal at the output of the chip 32 is a fault, by determining whether it lies within a predetermined time interval. The output 35 from the differential sensor is coupled to the chip 32, which uses part of the same circuitry to minimize complexity and redundancy of components; and the output of the chip is coupled as before through the load-on-line indicator 38 and to the switch 40.

In the event of a brown out occurring, such that the signal is detected by the differential sensor, the output opens the switch 40 as described above; and the operation is the same to connect the hot stand-by inverter 16 to the load 10.

It will be seen in FIG. 4 that a manual transfer switch S1 is also provided, for testing the circuit. Also, a capacitor 68 may be coupled between terminals 70 and 72 to allow interlock with a DC low voltage sensor of the rectifier control.

Figure 2:
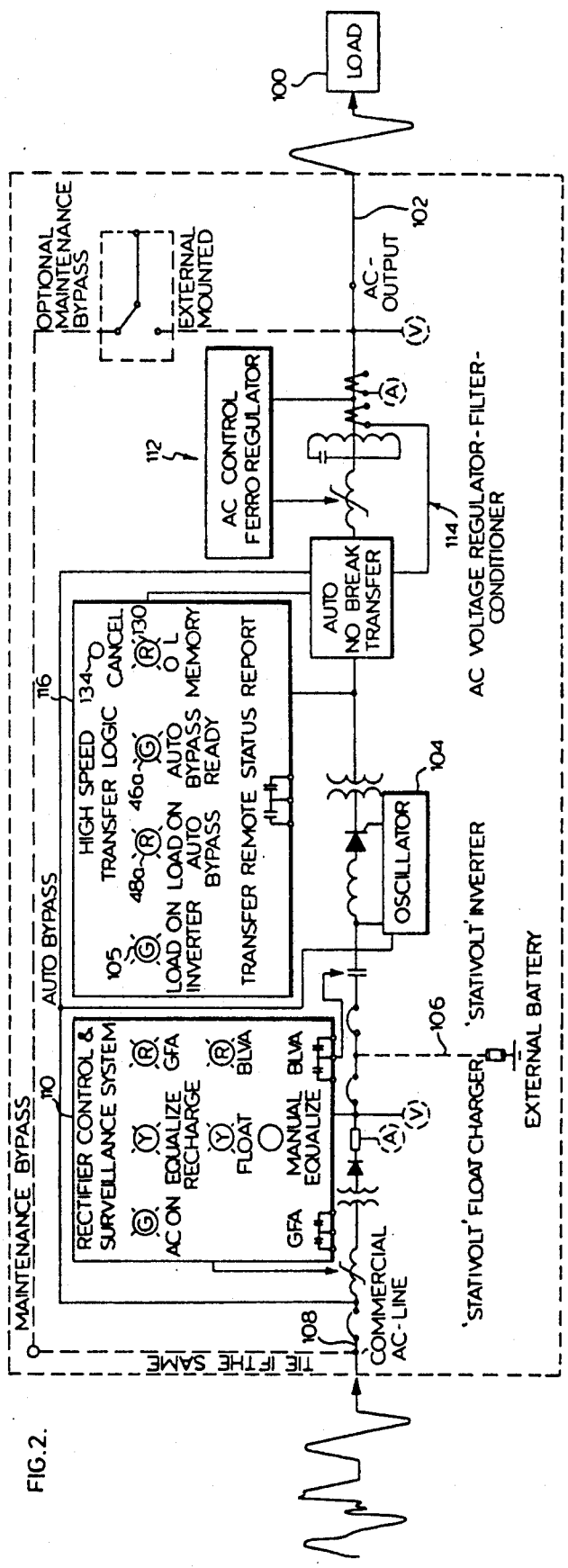
FIG. 2 is a schematic block diagram of another embodiment of a high speed load transfer system, in which a critical load is supplied by an inverter and the alternative power is supplied by a commercial AC bypass line.
Figure 7:
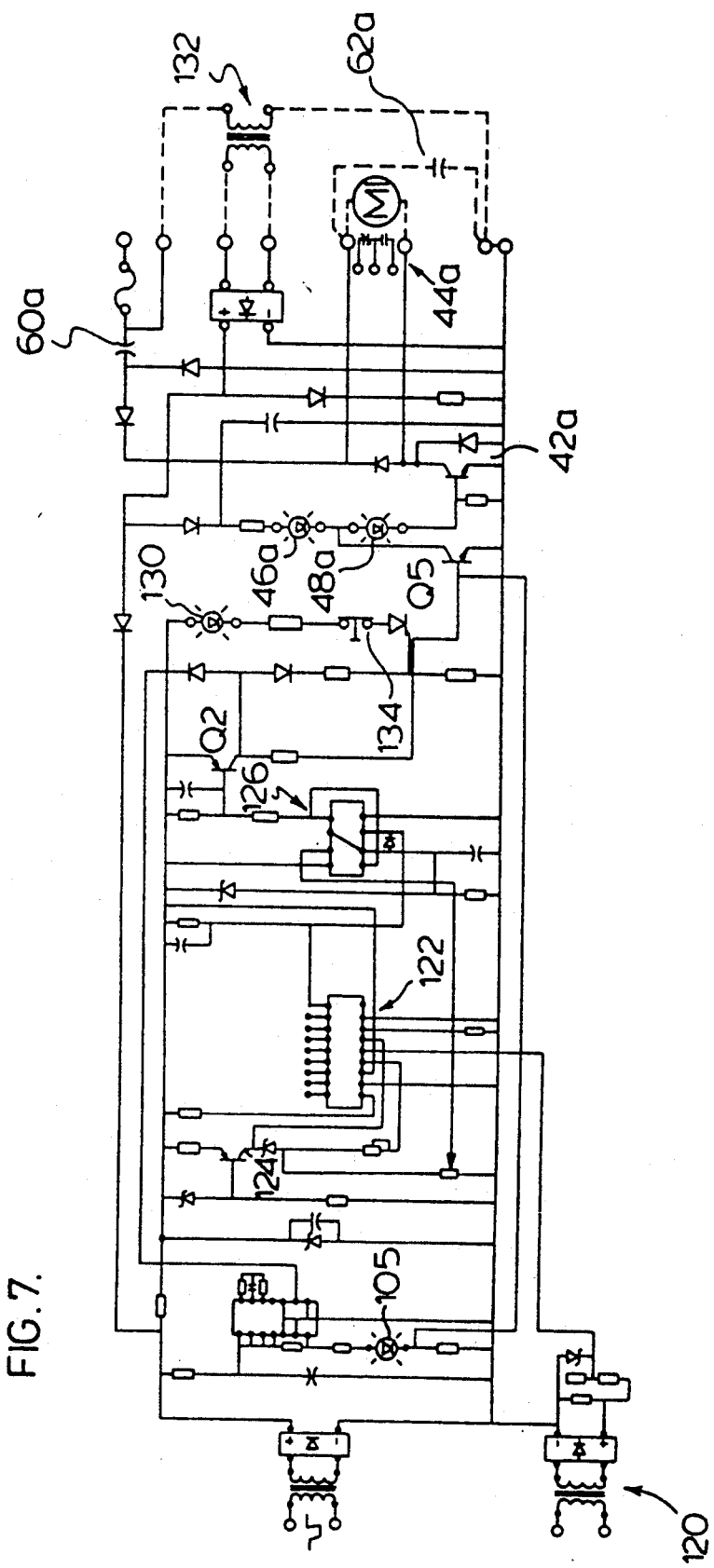
FIG. 7 is a more detailed circuit diagram of the block diagram shown in FIG. 6, showing the principal operating components thereof in a typical operating circuit, and also illustrating an inverter overload protection system.

Reference is now made to FIGS. 2, 6 and 7 of the drawings, which depict an alternative arrangement for connecting a load to a commercial AC line in the event of failure of primary AC supply from an inverter. Reference is first made to FIG. 2, which depicts a similar diagram to that shown in FIG. 1, and in which a load 100 is provided with AC power 102 from a STATI-VOLT inverter generally indicated by reference numeral 104. When power is being supplied by the inverter 104, the load-on-inverter indicator 105 is illuminated. The inverter 104 is powered by an external battery 106, which is charged via the commercial AC line 108. The circuit includes a rectifier controlled surveillance system 110, and an AC control ferro-regulator 112, both of which function in the same way as those components described with reference to FIG. 1. The AC output also includes a tuned circuit 114 for sensing the failure of the inverter power supply, and for providing a reverse power flow to the windings of the transformer of the high speed transfer logic circuit for sensing the power failure, as described before.

A high speed transfer logic circuit 116 monitors power failure or interruption, for switching the critical load 100 to the commercial AC line 108 from the inverter 104.

Reference is now made to FIGS. 6 and 7 of the drawings, which depict a schematic block diagram and circuit diagram, respectively, of the circuit 116 shown in FIG. 2. These circuits are similar to those shown in FIGS. 3 and 4. Indeed, the step sensor and voltage doubler circuitry operate in the same way, and like numerals refer to like parts with the suffix a added. The voltage doubler is depicted, for clarity, in two parts 50*a* and 50*b* meant to represent the input and output capacitors 60*a* and 62*a* shown in more detail in FIG. 7.

The circuit includes an inverter voltage overload control circuit for switching out the inverter and connecting the critical load to the commercial AC bypass line, in the event of inverter overload. The inverter overload sensing circuit includes a current transformer 120 for monitoring the real output of the inverter 104. The output voltage of the current transformer 120 is fed to a chip 122, which is such as a 10 stage direct overload comparator and delay circuit, and which functions as an overload level-to-time converter.

The chip 122, and its associated components, operates as follows: The inverter overload level is first compared with an overload reference level at position 124 (see FIG. 7), and the chip 122 determines from the level above the reference how fast the transfer should be made, or alternatively how long the delay should be. For example, if the monitored level is at 125% of the reference, the delay may be 10 minutes; for 150% of the reference the delay may be 10 seconds; for 175% it may be 0.1 seconds; and for 200%, it may be 0.01 seconds.

These values are set by the components coupled to the chip. The output of circuit 122 is coupled to a chip 126, which acts as a delayed overload and comparator reset circuit, and which provides a dual voltage reference triggering for overload sensing operation.

The overload output is taken from transistor Q2. The output of Q2 is passed to an overload indicator and memory circuit 130, which is a latched circuit and which protects against overloading. When the overload indicator 130 illuminates, the inverter is not allowed to retransfer until the load falls below 100% of the inverter rating. Also, the overload memory indication remains on until manually cancelled, using switch 134. Simultaneously, the overload alarm output is taken to switch Q5 to actuate the switch 44a, so as to actuate the output transfer circuitry in order to switch out inverter 104 and to switch in AC line 108 (see FIG. 2). The output switching circuits operate as described above, except that the inverter ready and load-on-inverter indicators are now by-pass-ready and load-on-bypass indicators 46a, and 48a, respectively. The voltage doubler circuit is the same as described above, and an auxiliary power supply 132 is shown for holding power on contactor M1 after the current surge from the DC capacitor.

It will be appreciated that various modifications may be made to the embodiments hereinbefore described, without departing from the scope of the invention.

What is claimed is:

1. A high speed load transfer system for use with a no-break uninterruptable power supply, for coupling an alternative source of AC voltage to a critical load in the event of interruption or failure of a primary AC voltage source; where, in normal circumstances, each of said primary AC voltage source and said alternative AC voltage source is operating independent of each other with respect to the critical load; said load transfer system comprising:

sensing means for sensing a change in said primary AC voltage source, said sensing means having an output coupled to switch means for switching the critical load between the primary AC voltage source and said alternative AC voltage source;

high speed transfer logic circuit means including said switch means and connected to said sensing means, said high speed transfer logic circuit being responsive to said output of said sensing means for actuating said switch means in the event of interruption or change in said primary AC voltage source, so as to rapidly couple said critical load to said alternative AC voltage source;

and a voltage doubler circuit with said high speed transfer logic circuit, wherein said voltage doubler circuit comprises a pair of conductors, each conductor having a pair of input terminals and a pair of output terminals;

said input terminals being connected to a voltage supply, and said output terminals being connected across a contactor;

an AC capacitor and a first diode rectifying means disposed in series in one of the pair of conductors and a second diode rectifying means being connected across the conductors with one end of said first rectifying means being coupled between said AC capacitor and said first diode rectifying means;

and a DC capacitor connected across the conductors at the output side of said first diode rectifying means;

whereby when an AC voltage is applied across the input terminals, an open circuit DC voltage of approximately double the magnitude of said applied voltage is charged across the DC capacitor; and in the event of the DC capacitor being discharged said AC capacitor then functions as an AC resistor to limit current to said contactor.

2. The high speed load transfer system of claim 1, wherein said sensing means includes a step sensor for sensing substantially instantaneous changes in said primary AC voltage source.

3. The high speed load transfer system of claim 1, wherein said sensing means includes a differential voltage sensor for sensing a change in said primary AC voltage source in a predetermined interval after the change has occurred.

4. The high speed load transfer system of claim 2, wherein said sensing means also includes a differential voltage sensor coupled in parallel with said step sensor, for sensing a change in said primary AC voltage source in a predetermined time interval after the change has occurred.

5. The high speed load transfer system of claim 1, wherein said contactor is a normally open/normally closed contactor.

6. The high speed load transfer system of claim 1, wherein said contactor is a solid state switch.

7. The high speed transfer logic circuit of claim 1, wherein said alternative AC power supply is a commercial AC bypass line.

8. The high speed transfer logic circuit of claim 1, including overload protection means for protecting an inverter in the event of overload of said inverter;

said overload protection means comprising current transformer means for monitoring the real output of the inverter and for providing a DC voltage signal proportional to said inverter output current;

a voltage overload comparator means for comparing said current transformer output with a reference value;

and timing means coupled to said overload comparator means, said timing means providing an overload output signal after a predetermined time depending on the magnitude of the overload;

said overload output signal being coupled to said switch means which are responsive to said overload signal and for coupling said critical load to a commercial AC bypass line.

9. The high speed transfer logic circuit of claim 8, wherein said overload protection means includes interlock means coupled to an overload and load transfer circuitry, for preventing re-transfer of the critical load until the overload rating falls beneath 100%.

10. The high speed transfer logic circuit of claim 9, wherein said interlock means includes manually resettable switch means for resetting said overload circuitry, and to permit re-transfer to the load.

11. The high speed transfer logic circuit of claim 1, wherein said switch means is a transfer contactor.

12. The high speed transfer logic circuit of claim 11, wherein said transfer contactor is a normally open/normally closed contactor.

13. The high speed transfer logic circuit of claim 11, wherein said transfer contactor is a solid state switch.

* * * * *